(12) United States Patent
McCurdy, Jr.

(10) Patent No.: US 7,303,053 B2
(45) Date of Patent: Dec. 4, 2007

(54) NON-PRESSURE HEAD WITH INTEGRATED PISTON STOP AND VENT/DRAIN

(75) Inventor: William B. McCurdy, Jr., Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 166 days.

(21) Appl. No.: 10/944,793

(22) Filed: Sep. 21, 2004

(65) Prior Publication Data
US 2006/0060433 A1    Mar. 23, 2006

(51) Int. Cl.
*B60T 11/00* (2006.01)
(52) U.S. Cl. .................. 188/153 D; 188/170; 92/82; 92/78
(58) Field of Classification Search ............ 188/153 D, 188/170, 322.19, 153 R; D12/180; 92/86, 92/130 A, 29, 80, 82, 78; 277/928, 514, 277/552, 918
See application file for complete search history.

(56) References Cited

U.S. PATENT DOCUMENTS

| | | | | |
|---|---|---|---|---|
| 1,615,370 A | * | 1/1927 | Farmer | ............. 92/78 |
| 1,939,845 A | * | 12/1933 | Farmer | ............. 92/78 |
| 2,135,251 A | * | 11/1938 | Farmer | ......... 277/500 |
| 2,277,124 A | * | 3/1942 | Maliphant et al. | ......... 92/130 R |
| 3,943,831 A | * | 3/1976 | Coupland | ............. 92/86 |
| 4,482,160 A | * | 11/1984 | Yanagi et al. | ............ 277/628 |
| 4,776,443 A | * | 10/1988 | Maruyamano et al. | ... 192/70.12 |
| D352,258 S | | 11/1994 | Rudd et al. | |
| D392,648 S | | 3/1998 | Karlsson | |
| 6,378,414 B1 | * | 4/2002 | Constantinides et al. | ...... 92/63 |
| D500,768 S | | 1/2005 | Brinton | |

* cited by examiner

*Primary Examiner*—Bradley King
(74) *Attorney, Agent, or Firm*—Barnes & Thornburg LLP

(57) ABSTRACT

A non-pressure head for a fluid cylinder, which includes a drain channel formed in the flange by a raised portion of the flange extending from a plane of the flange in the same direction as the head portion. The channel is cold formed in the flange. For the piston stop, the flange has an opening of a diameter smaller than a diameter of a piston on the piston rod to form a stop for the piston. A plurality of spaced ribs are provided between the flange and the head. The ribs are raised portions of the flange and the head and are cold formed in the flange and the head.

7 Claims, 4 Drawing Sheets

NON-PRESSURE HEAD WITH INTEGRATED PISTON STOP AND VENT/DRAIN

BACKGROUND AND SUMMARY OF THE DISCLOSURE

The present invention relates generally to fluid cylinders and more specifically to an improved non-pressure head of a brake cylinder.

Two presently used brake cylinders used in freight trains are illustrated in FIGS. 1-3. A cylinder portion 12 being a non-pressure side is connected to a non-pressure head portion 30. A piston 24 and piston rod 26 ride within the cylinder portion 12.

When the non-pressure head 30 was designed, the piston stop 36, shown in FIG. 1 and known as the chimney, was welded into the center of the non-pressure head 30. The piston stop 36 functions also as a spring guide, keeping the spring 46 axially aligned with the piston rod 26. In 1995, as markets became more competitive, the non-pressure head 30 was targeted for cost reduction. Since the chimney 36 was manually welded onto the non-pressure head 30 (a labor intense process), it was targeted for redesign.

Eliminating the chimney presented two problems. One problem was that the piston retaining or stop feature needed to be replaced. The other problem was that the spring needed to be guided in a different manner.

The piston stop function was accomplished by forming two flange extensions 37 in the flange area 32 of the non-pressure head 30', as shown in FIG. 2. The flange extensions 37 are approximately 7¹³⁄₁₆" apart, which is less that the OD of the piston 24. When the piston 24 contacted these flat features 37, the piston 24 stopped traveling, thus retaining the piston in the cylinder bore. A piece of plastic 48 was designed in a helical shape at the same pitch as the return spring 46 in its free state. It is thick enough to evenly fill the gap between the piston rod 26 and the return spring 46 and act as a guide.

The interface of the non-pressure head 30, 30' with the brake cylinder 12 is sealed by a gasket 50. The gasket 50, in conjunction with the piston rod gasket, seals the non-pressure cavity from the atmosphere, keeping contaminants out. The non-pressure cavity volume changes as the piston 24 strokes to and fro with brake cylinder signal. A vent is required to allow the non-pressure cavity volume to react to the change in volume. The vent 60 (shown in FIGS. 2 and 3) is built into the head portion 34. The vent cavity 60 is attached to the side of the head portion 34. To keep debris out of the non-pressure cavity, the vent opening is filtered with a piece of open celled foam 62 held by clasp 64.

The location of the vent 60 is not at the lowest point of the non-pressure head's cavity. As a result, in the event of water intrusion, possibly through condensation or gasket failure, the water cannot escape and corrosion results. Because the vent housing 60, known as the strainer case, is welded to the side of the non-pressure head, it impedes stacking one non-pressure head on top of another. This stackability is desirable because it facilitates efficient shipping and stocking. The labor intense welding process involved to secure the strainer case results in high product costs. Also, the two-sided piston stop 37 may not support the piston symmetrically causing uneven loading of the piston.

The presently disclosed non-pressure head for a fluid cylinder addresses these issues and includes a drain channel formed in the flange by a raised portion of the flange extending from a plane of the flange in the same direction as the head portion. The channel is cold formed in the flange. For the piston stop, the flange has an opening of a diameter smaller than a diameter of a piston on the piston rod to form a stop for the piston portion. A plurality of spaced ribs are provided between the flange and the head. The ribs are raised portions of the flange and the head and are cold formed in the flange and the head.

The disclosed non-pressure head may be part of a kit for a fluid cylinder, which further includes a compressible, porous material to be positioned between a pressure head and the flange and having a thickness at least as large as the depth of the channel. An annular gasket may also be in the kit, and the porous material is joined to the gasket.

Also disclosed is a fluid cylinder having a pressure head and a non-pressure head joined at respective annular flanges and an annular gasket between the flanges. A piston moves in the pressure head and is mounted to a piston rod extending through and exiting the non-pressure head at an opening. A drain channel is provided in the flange of the non-pressure head facing the channel. The drain channel is a raised portion of the flange extending from a plane of the flange. The channel is cold formed in the flange. A compressible, porous material is between the gasket and the flange of the non-pressure head and has a thickness at least as large as the depth of the channel. The porous material is joined to the gasket as a unit.

These and other aspects of the present disclosure will become apparent from the following detailed description of the disclosure, when considered in conjunction with accompanying drawings.

DETAILED DESCRIPTION OF THE PREFERRED EMBODIMENTS

Figure 1:
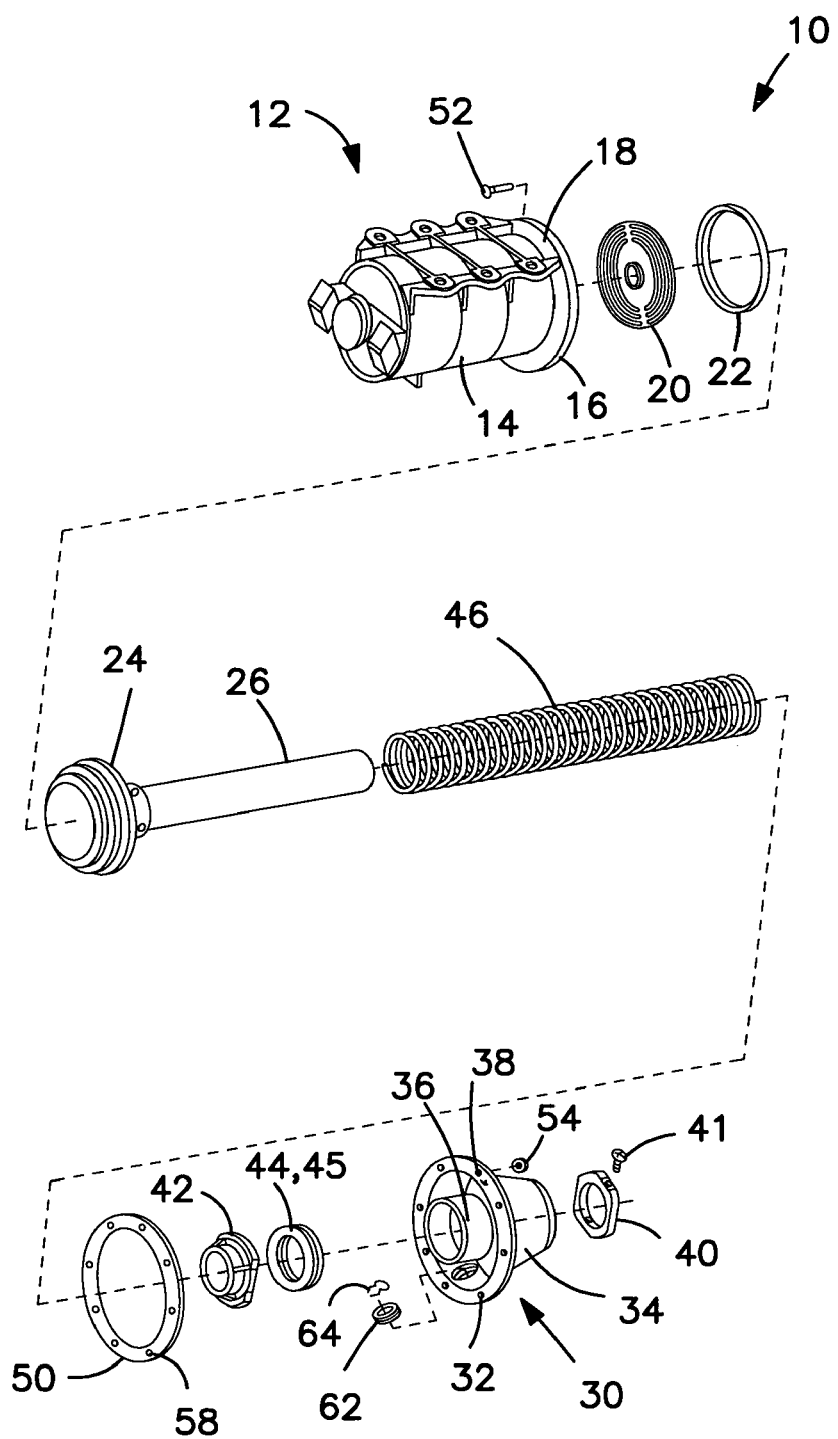
FIG. 1 is an exploded view of a first brake cylinder of the prior art.

The fluid brake cylinders of the prior art, shown in FIGS. 1 through 3, will now be described in detail. Those elements which have the same structure and/or function have the same reference numbers in the drawings. The brake cylinder 10 includes a pressurized section 12, which includes a cylinder portion 14 and a flange 16. Fastener openings 18 are provided in the flange 16. A packing cup 20 and a guide ring 22 are mounted on a piston 24, which is mounted to piston rod or pipe 26. A non-pressure head 30 includes a flange 30 and a head portion 34 extending therefrom. A spring guide and piston stop 36 is welded to the head portion 34. Fastener openings 38 are provided in the flange 32. A collar 40 is held fixed to the head portion 34 by a fastener 41.

A combined spring seat and bearing 42 is mounted within the non-pressurized head 30. Combined swab retainer 44 and swab felt 45 are also mounted in the head portion 34 and forms a seal about the piston rod 26. Retainer spring 46 rests on spring seat 42 and presses against the non-pressurized side of the piston 24. A gasket 50 is positioned between the flanges 16, 32 and includes fastener openings 58. Fasteners 52 extend through the fastener openings 18, 38, 58 and secure the pressure head 12 to the non-pressure head 30 with a nut 54. The head portion 34 of the non-pressure head 30 includes a vent 60. Inserted in the vent 60 is a strainer or filter 62 retained therein by retainer 64. This may be an open foam material. The vent housing 60 is illustrated in FIG. 3.

Figure 2:
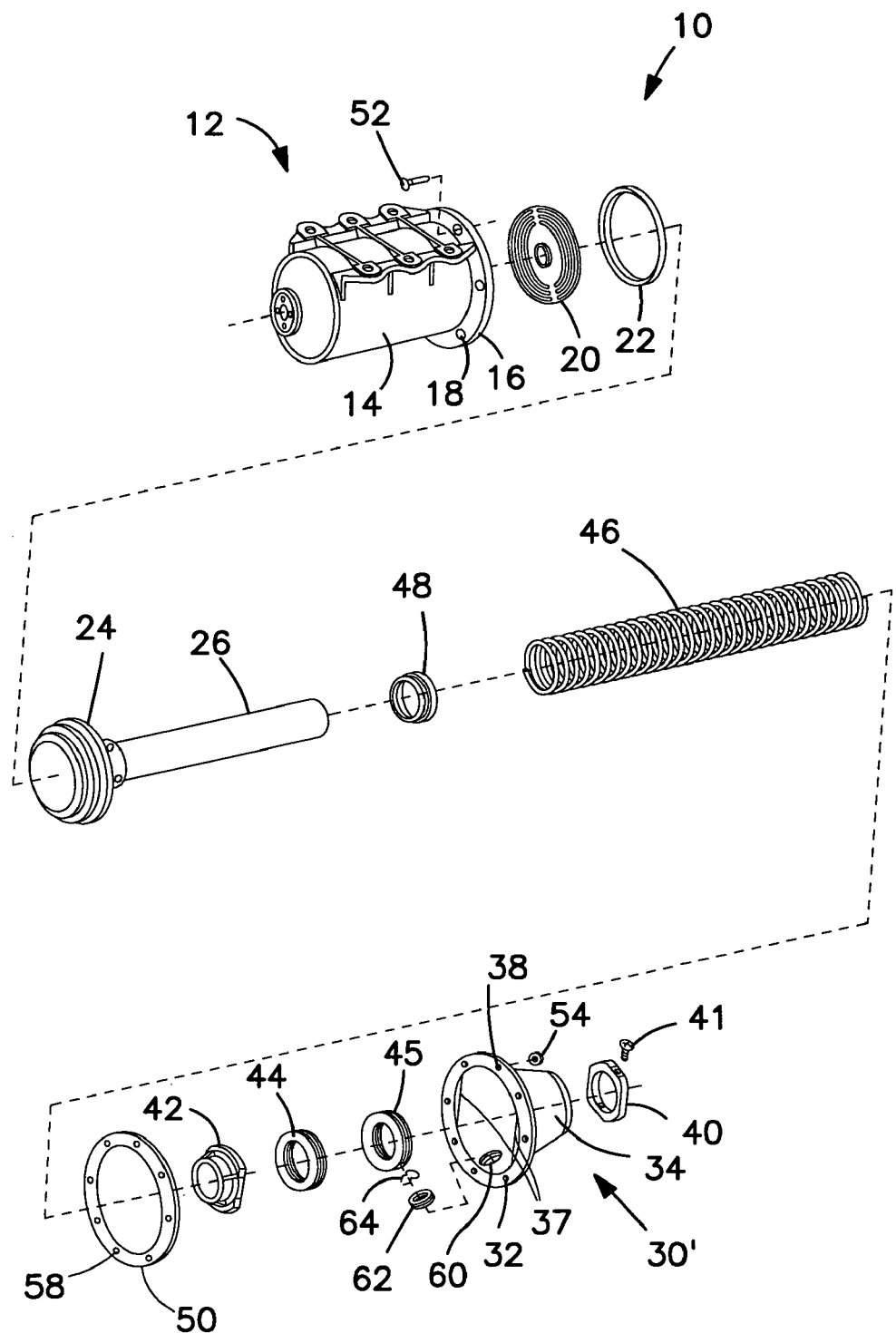
FIG. 2 is an exploded view of a second brake cylinder of the prior art.
Figure 3:
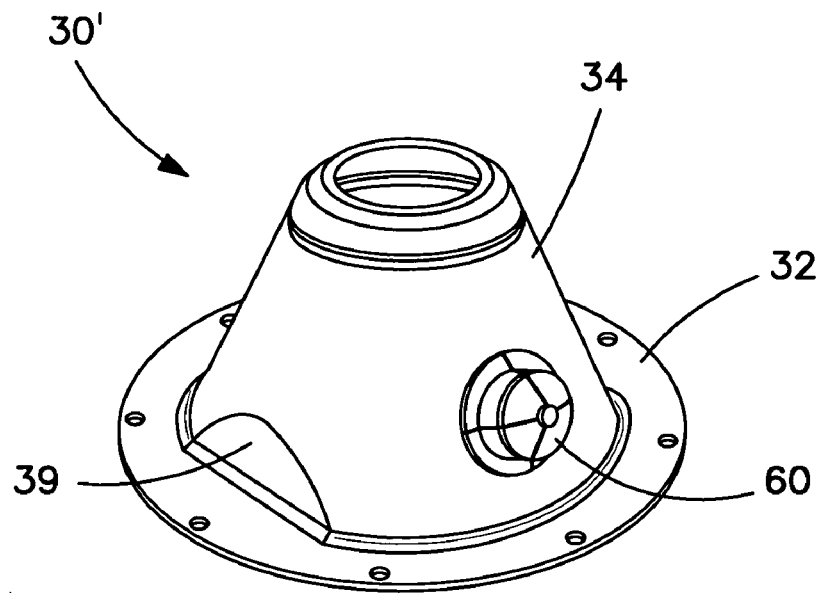
FIG. 3 is a perspective view of the non-pressure head of the brake cylinder of FIG. 2.

As previously noted, a later embodiment of the brake cylinder is illustrated in FIG. 2. The major differences are that the piston stop and spring guide 36 has been removed. Spring guide 48 has replaced the spring guide portion 36. The stops are extended flange portions 37 formed by flats 39 formed in the generally conical portion of the head 34. As previously noted, the vent housing 60 is welded to the side of the head portion 34.

The brake cylinder of FIG. 1 is Part No. 704874 and that of FIG. 2 is Part No. 762838, both of which are available from New York Air Brake Corporation of Watertown, N.Y.

A non-pressure head is illustrated in FIGS. 4-7. The same tens and unit numbers are used corresponding to that of the prior art of FIGS. 1-3 and have the same purpose and function. A non-pressure head 130 includes a flange 132 and a head portion 134. The head portion 134 includes a generally non-tapered portion 132 to which is connected the tapering portion 133. The generally non-cylindrical or flat portions 139 are continuous and form a basically continuous stop region 137 of the flange 132, as illustrated specifically in FIG. 6. To strengthen the flange and the stop portions, a plurality of spaced ribs 131 are provided between the flange 132 and flat portions 139 of head portion 134. The ribs 131 are cold formed and are part of the process of forming the unitary non-pressure head 130.

Figure 5:
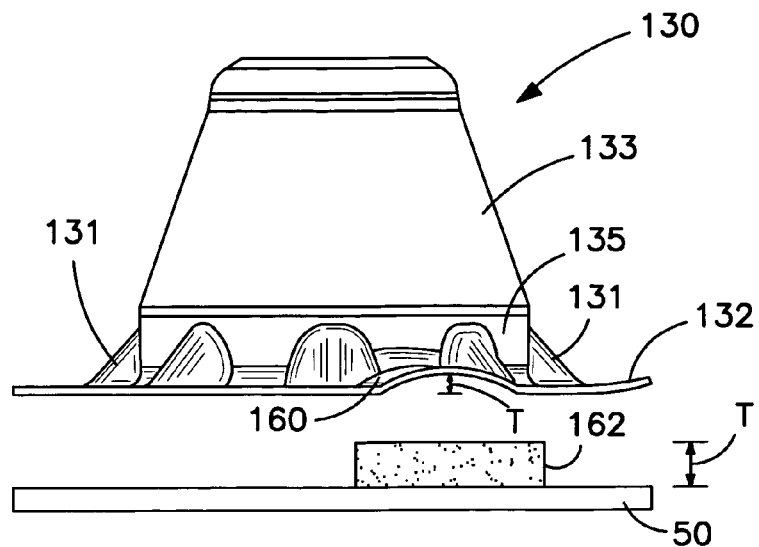
FIG. 5 is a side view including a gasket and foam, according to the present disclosure.

A portion of the flange 132 is raised at 160 to provide the drainage duct or vent 160. Thus, a drainage duct would be between the flange 132 and the gasket 50. A filter 162 is positioned in the duct 160 between the gasket 50 and the flange 132. The thickness T of the filter 162 is greater than the depth D of the channel 160, as illustrated in FIG. 5. It should also be noted that, as illustrated, the filter material 162 may be joined to the gasket 50 as a unitary unit. This may be by adhering it thereto as a single unit.

A non-pressure head 130 and the filter material 162 may be provided as a kit with or without the gasket 50. Alternatively, gasket 50, as a separate element or with the strainer material 162 as a unit, may also be provided in a kit.

When the non-pressure head 130 is joined to the cylinder or pressure head 12, the strainer material 162 is compressed and fills the depth D of the channel formed by the raised portion 160. This places the drainage or vent at the lowest possible point and thereby improves the drainage of liquid from the non-pressure head 130. The channel or duct formed by the raised portion 160 is cold formed during the formation of the non-pressure head 130.

Figure 4:
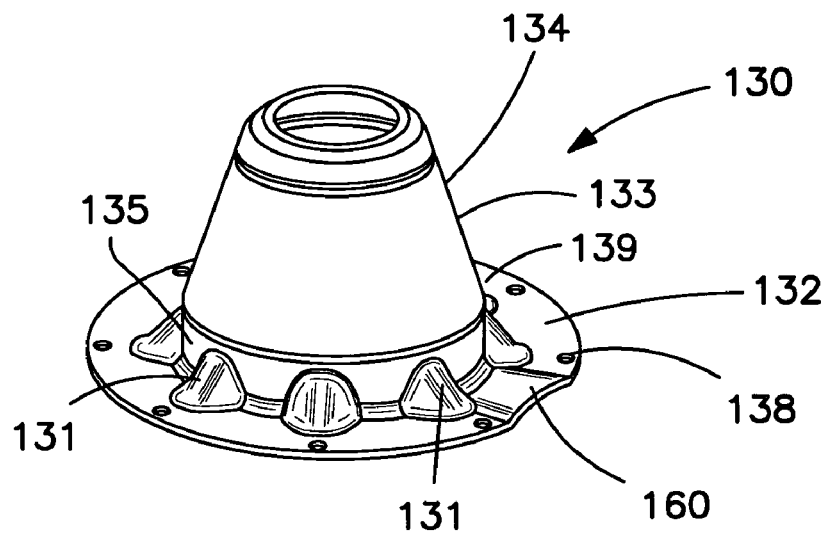
FIG. 4 is a perspective view of a non-pressure head, according to the present disclosure.
Figure 6:
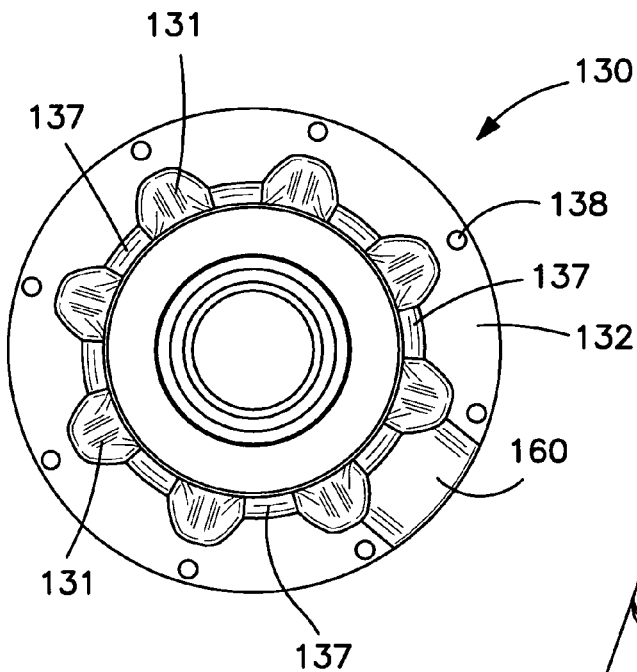
FIG. 6 is a bottom view of the non-pressure head of FIG. 4.
Figure 7:
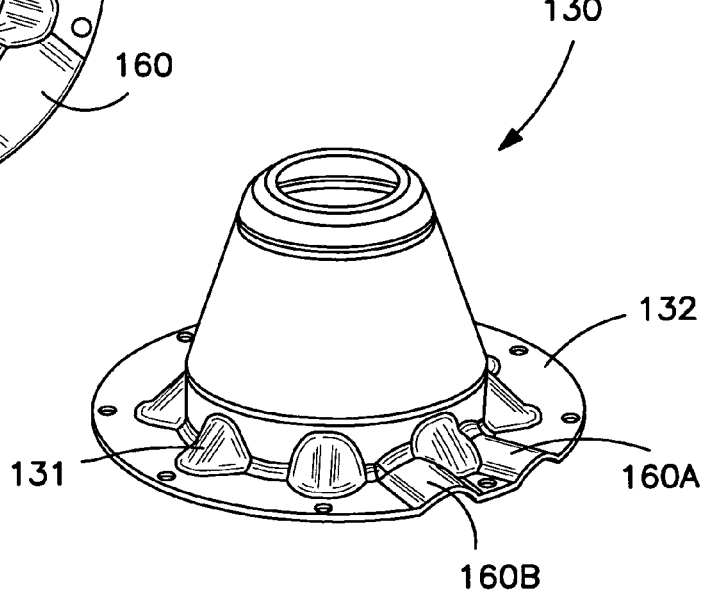
FIG. 7 is a perspective view of a dual port non-pressure head, according to the present disclosure.

Although only one duct 160 is shown in FIGS. 4-6, two such ducts 160A, 160B are shown in FIG. 7. Other ducts may be provided.

By providing the ribs 131, the thickness of the material used for forming the non-pressure head 130 has been reduced. This not only reduces cost, but it reduces the weight of the cylinder. Thickness has been reduced, for example, from $136/1,000$ of an inch to $104/1,000$ of an inch. This has resulted in a 31 percent reduction in weight for approximately 2.9 pounds. By providing a substantially continuous stop surface 137 on the flange 132, a substantially greater stop surface has been provided, thereby providing a more symmetrical stop surface and distribution of the forces. By eliminating the vent housing 60 as a separate piece, the cost of welding is eliminated. Also, making an integral raised portion of the flange 132 makes the non-pressure head 130 stackable and therefore more economical to ship and store.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed is:

1. A pneumatic brake cylinder comprising:
   a pressure head and a non-pressure head joined and mated at respective annular flanges;
   an annular gasket between the flanges;
   a piston movable in the pressure head and mounted to a piston rod extending through and exiting the non-pressure head at an opening;
   a drain channel in the mating surface of the flange of the non-pressure head extending parallel to and across the mating surface of the flanges; and
   a plurality of spaced ribs formed in the flange and the head of the non-pressure head as raised portions of the flange and the head.

2. The cylinder of claim 1, where the drain channel is a raised portion of the flange extending from a plane of the flange.

3. The cylinder of claim 2, wherein the channel is cold formed in the flange.

4. The cylinder of claim 1, wherein the flange of the non-pressure head has an opening of a diameter smaller than a diameter of the piston to form a stop for the piston.

5. The cylinder of claim 1, wherein the ribs are cold formed in the flange and the head portion.

6. The cylinder of claim 1, including a compressible, porous material between the gasket and the flange of the non-pressure head in the channel and having a thickness at least as large as the depth of the channel.

7. The cylinder of claim 6, wherein the porous material is joined to the gasket as a unit such that it fills at least the depth of the channel and extends over the adjacent portions of the flange.

* * * * *